(12) United States Patent
Chien et al.

(10) Patent No.: US 7,475,860 B2
(45) Date of Patent: Jan. 13, 2009

(54) ADSORPTION-DETECTING DEVICE

(76) Inventors: Li-Sheng Chien, 5F., No. 67, Lane 201, Jhongjheng Rd., Shihlin District, Taipei City 111 (TW); Chien-Chang Ho, 5F., No. 8, Alley 1, Lane 25, Fongjiang Rd., Taishan Township, Taipei County 243 (TW)

( * ) Notice: Subject to any disclaimer, the term of this patent is extended or adjusted under 35 U.S.C. 154(b) by 29 days.

(21) Appl. No.: 11/688,460

(22) Filed: Mar. 20, 2007

(65) Prior Publication Data
US 2008/0230660 A1 Sep. 25, 2008

(51) Int. Cl.
*F16B 47/00* (2006.01)
(52) U.S. Cl. ........................................ 248/363; 248/542
(58) Field of Classification Search ................. 248/363, 248/205.5, 205.7, 205.8, 205.9, 206.1, 206.2, 248/542
See application file for complete search history.

(56) References Cited

U.S. PATENT DOCUMENTS

| | | | | |
|---|---|---|---|---|
| 5,042,418 A | * | 8/1991 | Hoover et al. ................ 116/173 |
| 5,104,077 A | * | 4/1992 | Liu .......................... 248/205.8 |
| 7,021,593 B1 | * | 4/2006 | Fan ........................... 248/206.2 |
| 2007/0152119 A1 | * | 7/2007 | Wang ........................ 248/205.5 |
| 2008/0011917 A1 | * | 1/2008 | Adams ...................... 248/205.5 |
| 2008/0099653 A1 | * | 5/2008 | Chiang et al. ............... 248/500 |
| 2008/0111037 A1 | * | 5/2008 | Carnevali ................. 248/206.2 |

* cited by examiner

*Primary Examiner*—Ramon O Ramirez
(74) *Attorney, Agent, or Firm*—Dykema Gossett PLLC

(57) ABSTRACT

An adsorption-detecting device of the present invention comprises a case, wherein a containing part is in one side of the case, and a window is set on one surface of the case; an adsorption means which is in the case; and a detecting means which is in the containing part, wherein the detecting device further comprise a combining base, a pull unit which is a moveable set is located in the combining base, a display unit which is set on the pull unit, and an elastic part having two ends connecting to the combining base and the display unit, and one end of the pull unit extrudes from the combining base, and two identified areas corresponding to the window are set on one surface of the display unit. The adsorption-detecting device of the present invention allows the user to determine the adsorb ability of the adsorption means by utilizing the detecting means 3.

9 Claims, 3 Drawing Sheets

ADSORPTION-DETECTING DEVICE

BACKGROUND OF THE INVENTION

1. Field of the Invention

The invention relates to an adsorption-detecting device, more particularly to an adsorption-detecting device which detects the adsorption of the adsorptive mechanism for avoiding falling off.

2. Description of the Related Art

Conventional adsorptive mechanism is widely used as a supporting device, such like an arm rest, a support or a basin. Those supporting devices can attach onto smooth wall surface, such as ceramic tile surface by its adsorptive mechanism, as a result, those supporting devices also can be utilized to support and carry other goods.

Although the conventional supporting devices can adhere onto smooth wall surface like ceramic tile by the adsorptive mechanism in order to support and carry goods. However, the sucker of those conventional supporting device must be used on a ceramic tile surface, or a smooth wall surface to achieve the attaching effect. Therefore, if it is used in a bathroom for a long time plus the external environmental effect and the overloading problem, the sucker would start to loose its sucking ability resulting the conventional support device to slide away or detach from the wall surface. In general, we cannot detect the problem from the external appearance of the sucker when the sucker starts to loose its adhesive ability. Therefore, the users can not find out easily whether the conventional supporting device is in a good condition or not, or whether the sucker still retains its adhesive ability or not. The only way for the users to find out is when the conventional supporting device is no longer attached onto the wall, i.e. sliding off or detaching from the wall.

SUMMARY OF THE INVENTION

An object of the present invention is to provide an adsorption-detecting device, capable of detecting the adsorption of the adsorptive mechanism when the adsorptive mechanism adsorbs onto a wall in order to prevent the detachment from occurring.

The adsorption-detecting device of the present invention comprises a case, in which a containing part is in one side of the case, and a window is set on one surface of the case; a adsorption means is located in the case; and a detecting means which is in the containing part, the detecting device comprise a combining base, a pull unit which is a moveable set in the combining base, a display unit which is set on the pull unit, and an elastic part having two ends respectively connecting to the combining base and the display unit, and one end of the pull unit extrudes from the combining base, and two identifying areas corresponding to the window are set on one surface of the display unit. Both the forgoing general description and the following detailed description are exemplary and explanatory only and are not restrictive of the invention, as claimed.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the invention. In the drawings.

DETAILED DESCRIPTION OF THE PREFERRED EMBODIMENTS

Figure 1:
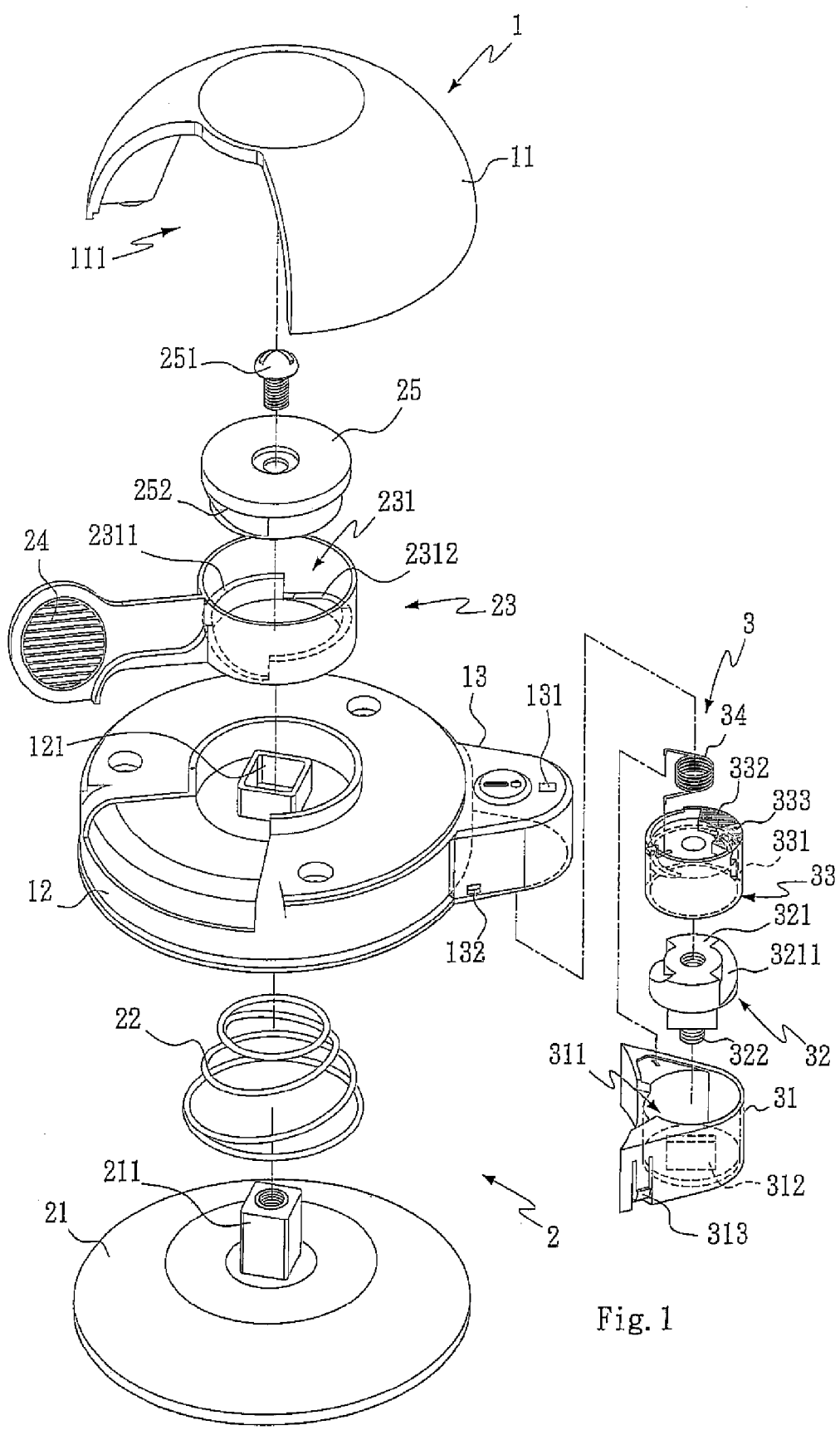
FIG. 1 is an exploded perspective view of an adsorption-detecting device of the present invention.
Figure 2:
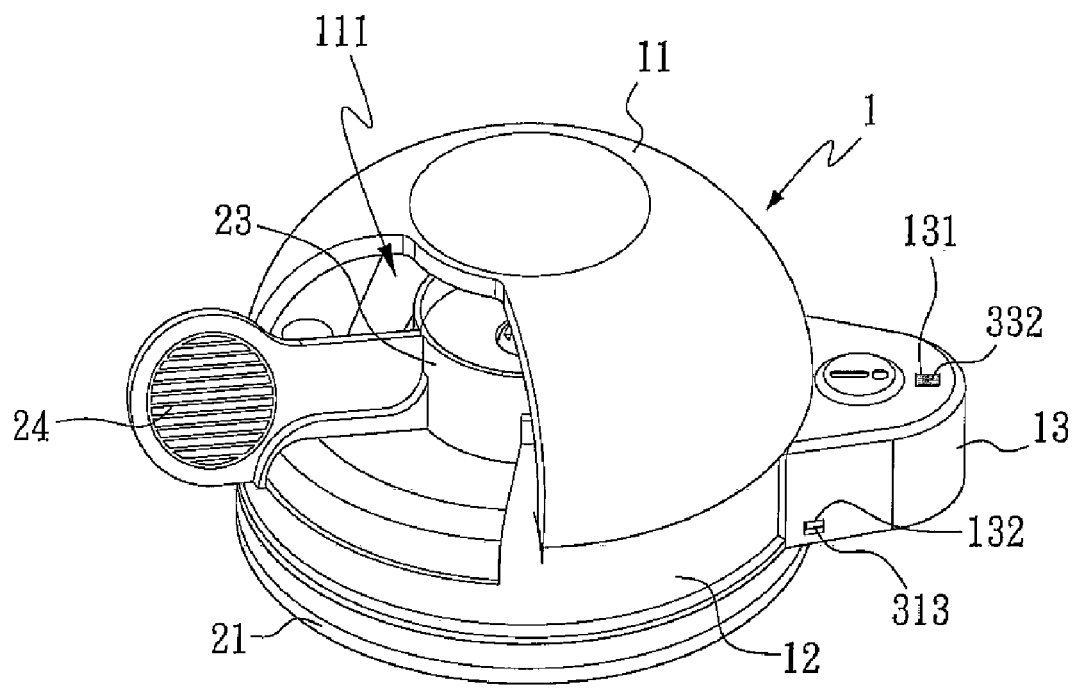
FIG. 2 is a 3-D view of an assembled adsorption-detecting device of the present invention.

Before the present invention is described in greater detail, it should be noted that same reference numerals have been used to denote like elements throughout the specification. FIG. 1 and FIG. 2 are respectively an exploded perspective view and a 3-D view of the adsorption-detecting device of the present invention. As shown in the drawings, the present invention is related to an adsorption-detecting device comprising a case 1, a adsorption means 2 and a detecting means 3. The adsorption-detecting device of the present invention allow a user to detect the adsorb ability of the adsorption means 2 by utilizing the detecting means 3 in order to prevent the detachment from occurring The case 1 described above comprises an upper cover 11 with a gap 111 in one side, and a base 12 with a perforation 121 in the middle. A containing area 13 having a window 131 on one surface is set on one side of the base 12, and two sides of the containing area 13 having a fixed hole 132 respectively. The adsorption means 2 of the case 1 further comprises a sucker 21 with a barrel 211 of the sucker 21 which can go through the perforation 121, an elastic part 22 which is set in between the sucker 21 and the base 12, a moving shaft 24 having a movable sleeve 23 on one end which is connected to a top portion of the base 12, and its movement is restrained within the gap 111 of the upper cover 11, and an inserting unit 25 located in the sleeve 23 is used to connect a fixing part 251 with the barrel 211 of the sucker 21, wherein a guiding part 231 comprises two corresponding surfaces 2311 and a slant surface 2312, in which the guiding part 231 is positioned at an inner portion of the sleeve 23, and the slant surface 2312 is formed in between the two corresponding surfaces 2311. A sliding block 252, which is formed at an external part of the inserting unit 25 is corresponding to the guiding part 231.

The detecting means 3 is located in the containing area 13 which is on one side of the base 12, wherein the detecting means 3 comprises at least one combining base 31, a fillister 311 is formed in the combing base 31. A perforation 312 located at the bottom part of the combining base 31 is corresponding to the fillister 311, and two sides of the combining base 31 having a buckle means 313 respectively, wherein the buckles means 313 is used to integrate with the fixed hole 132 located respectively on each side of the containing area 13. A pull unit 32 is located in the fillister 311 of the combining base 31, and the both sides of the pull unit 32 comprise two push blocks 321 having concave surface 3211 respectively. A probe 322 located at the bottom of the push unit 321 is penetrated through the perforation 312 of the combining base 31, and a display unit 33 is positioned onto the pull unit 32, wherein two slanting ridges 331, which are corresponding to the concave surfaces 3211 of the push unit 321 are formed respectively on each inner side of the display unit 33. One side of the display unit 33 comprises two identified areas 332 and 333 which are corresponding to the window 131 of the containing area 13, wherein the two identified areas 332, 333 comprises the ability to illustrate different colors, for example, red and green, and an elasticity part 34 which comprises two ends that can be used to connect the combining base 31 to the display unit 33. Therefore, the present invention provides an improved and inventive detecting device as described above.

Figure 3:
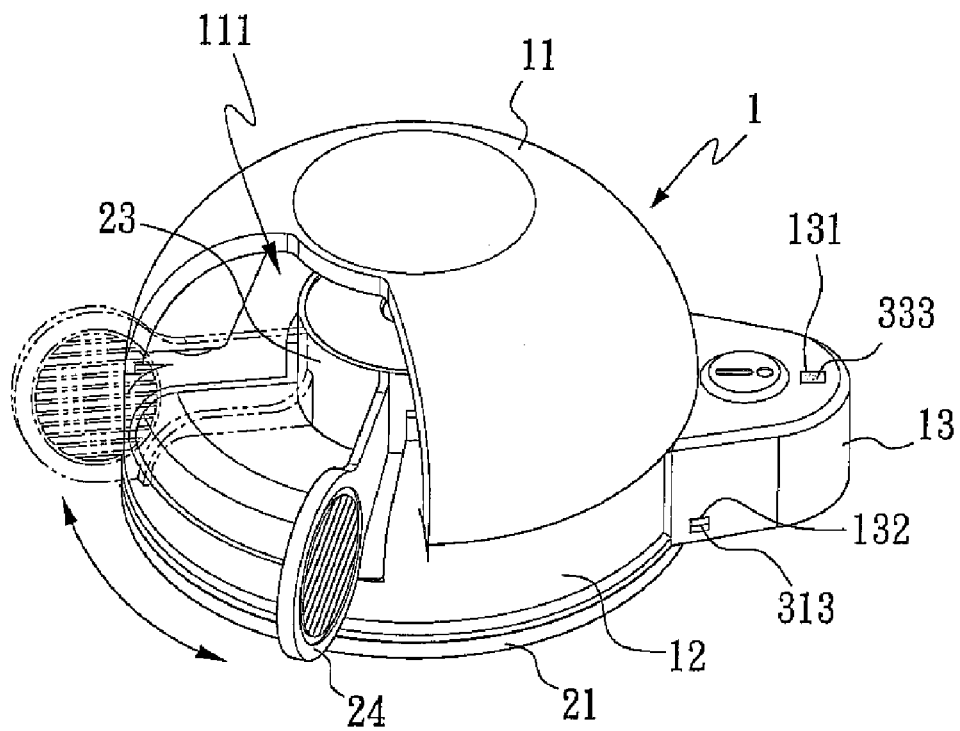
FIG. 3 is a schematic view of showing how an adsorption-detecting device of the present invention operates.
Figure 4:
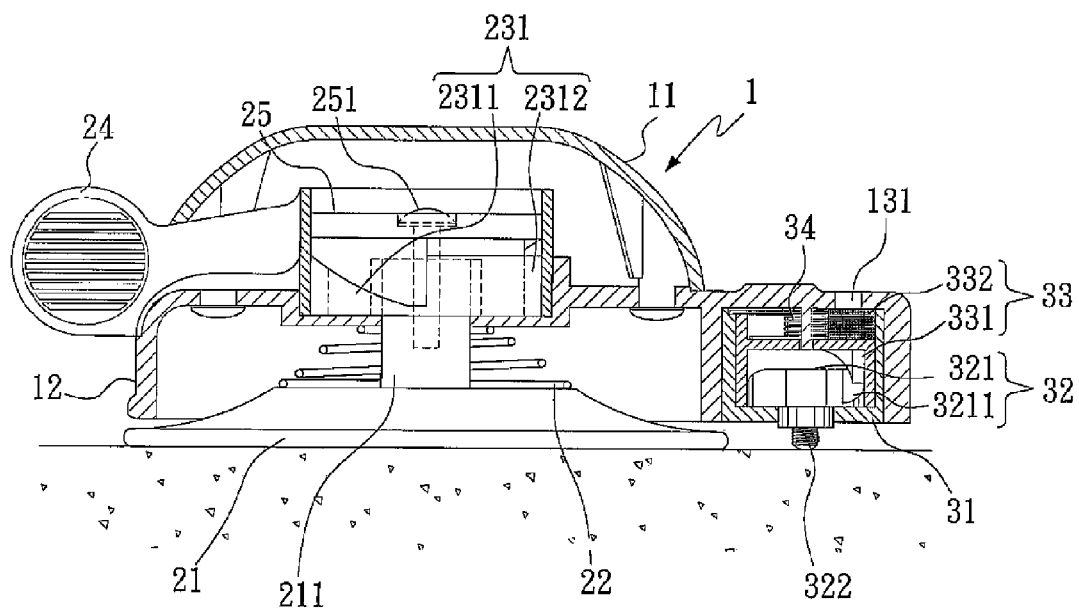
FIG. 4 shows a cross-sectional view of the adsorption-detecting device in an adsorbing state of the present invention.
Figure 5:
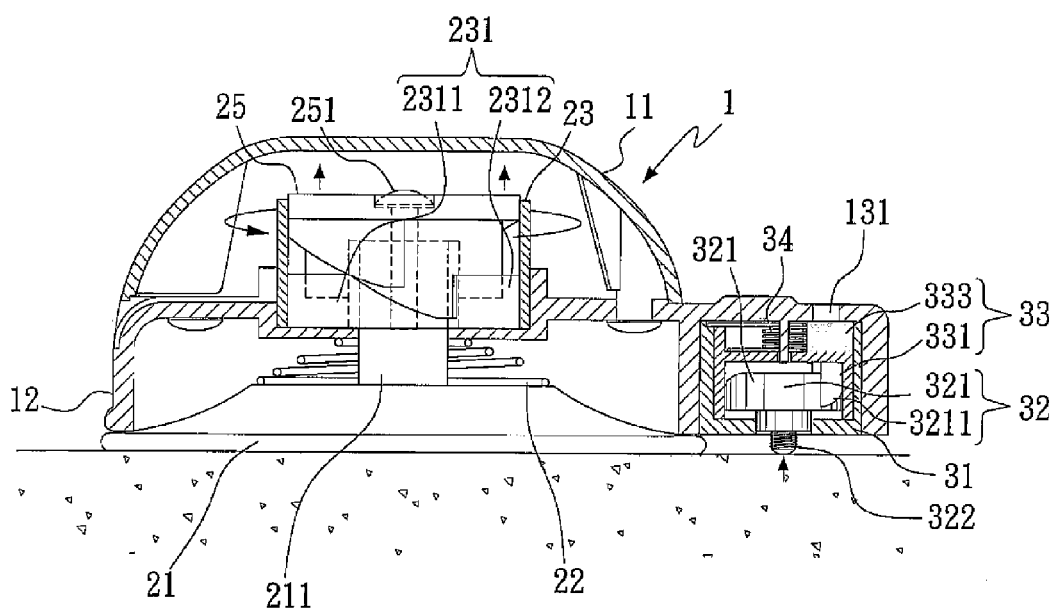
FIG. 5 shows a cross-sectional view of the adsorption-detecting device in a loosing state of the present invention.

FIG. 3, FIG. 4 and FIG. 5 are schematic views of an adsorption-detecting device respectively in an acting state, an adsorbing state and a loosing state in accordance with preferred examples of the present invention. As shown in the drawings, during the operation of the adsorption-detecting device, the sucker 21 of the adsorption means 2 is adhered onto the wall 4, and then the moving shaft 24 is operated to rotate the sleeve 23 on one end of the moving shaft. 24 so that the inserting unit 25 of the sleeve 23 can utilize the sliding block 252 to slide along the slanting surface 2312 of the guiding part 231 in order to reach the corresponding surfaces 231. As a result, the inserting unit 25 of the sleeve 23 moves upward to pull the barrel 211 of the sucker 21 resulting the sucker 21 being adjacent to the wall 4 and discharged the air in between the sucker 21 and the wall 4. The adsorption means 2 utilizes the sucker 21 to adsorb onto the wall 4 firmly While the adsorption means 2 adsorbs onto the wall 4, the pull unit 32 of the detecting means 3 will utilizes the probe 322 protruding outside the combining base 31 to compress against to the wall 4 and push towards the display unit's 33 direction simultaneously. The push block 321 of the pull unit 32 utilizes the concave surface 3211 located both sides of the push unit 321 to move along the slanting ridge 331 which is positioned on the inner wall of the display unit 33. The display unit 33 rotates and compresses against the elasticity part 34 in such that the green identify area 333 of the display unit 33 is correspondingly to the position of the window 131 of the containing area 13 to indicate that the adsorption means 2 is adhered firmly onto the wall 4.

When the adsorption-detecting device of the present invention is used for a period of time, the structure of the adsorption-detecting device is no longer stable or the moving shaft 24 is no longer to pull the sucker 21 so that the sucker 21 can be adhered onto the wall 4 tightly, the detachment of the adsorption means 2 from the wall 4 would occur, and the probe 322 of the pulls unit 32 can not be compressed against to the wall 4 precisely, the concave surface 3211 on both sides of the pushes block 321 would be disintegrated and slide away from the slanting ridge 331 of the display unit 33 to result decompression of the elasticity part 34 in such that the elasticity part 34 is no longer under the compression, and it would bound back its elasticity to result the display unit 33 rotates in a reverse direction. The red identify area 332 of the display unit 33 is then corresponding to the position of the window 131 of the containing area 13. In other words, the red identify area 332 represents that the adsorption means 2 does not longer function properly to adhere onto the wall 4 securely. So that a user can determine the adsorb ability of the adsorption means 2 to the wall 4.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. An adsorption-detecting device, comprising:
a case, wherein a containing part is located in one side of the case, and a window is set on one surface of the case;
an adsorption means, positioning in the case; and
a detecting means which is located within the containing part, wherein the detecting means further comprise a combining base, a pull unit which is a moveable set is located in the combining base, a display unit which is set on the pull unit, and an elastic part having two ends connecting respectively to the combining base and the display unit, and one end of the pull unit extrudes from the combining base, and two identified areas corresponding to the window are set on one surface of the display unit.

2. The adsorption-detecting device of claim 1, wherein the case comprises a base having one gap in one side, and an upper cover having a perforation, and the containing part is set on one side of the base, and a hole is formed at both sides of the containing area respectively.

3. The adsorption-detecting device of claim 1, wherein the adsorption means comprises a sucker located on one surface of the case, an elasticity part set in between the sucker and the case, a moving shaft having a movable sleeve on one end that is connected to a top portion of the base, and an inserting unit that is utilized to connect the sucker to the sleeve.

4. The adsorption-detecting device of claim 3, wherein a guiding part comprises two corresponding surfaces and a slant surface, in which the guiding part is positioned at an inner portion of the sleeve, and a sliding block is formed at an external part of the inserting unit is corresponding to the guiding part.

5. The adsorption-detecting device of claim 3, wherein the inserting unit is connected to the sucker by a fixed part.

6. The adsorption-detecting device of claim 1, wherein the combining base has a fillister, a perforation connecting to the fillister is formed on the bottom of the combining base, and each side of the combining base has a buckle means respectively.

7. The adsorption-detecting device of claim 1, wherein the pull unit comprises a push block having concave surface on two sides, and a probe which is extruding from the combining base is formed on the bottom of the push block.

8. The adsorption-detecting device of claim 1, wherein a slanting ridge, which is corresponding to the push unit is formed respectively on both inner sides of the display unit.

9. The adsorption-detecting device of claim 1, wherein the two identified areas of the display unit comprises an ability to illustrate different colors.

* * * * *